(12) United States Patent
Nishino

(10) Patent No.: US 7,422,247 B2
(45) Date of Patent: Sep. 9, 2008

(54) BRANCH TEE FITTING

(75) Inventor: Hisanori Nishino, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 304 days.

(21) Appl. No.: 10/564,152

(22) PCT Filed: May 27, 2005

(86) PCT No.: PCT/JP2005/009778

§ 371 (c)(1), (2), (4) Date: Jan. 11, 2006

(87) PCT Pub. No.: WO2005/116510

PCT Pub. Date: Dec. 8, 2005

(65) Prior Publication Data

US 2007/0102925 A1    May 10, 2007

(30) Foreign Application Priority Data

May 28, 2004    (JP) .............................. 2004-159114

(51) Int. Cl.
*F16L 41/00*    (2006.01)

(52) U.S. Cl. ............... 285/133.6; 285/133.3; 285/133.5

(58) Field of Classification Search ............. 285/133.3, 285/133.5, 133.6, 133.11, 133.21, 133.4; 256/65.01, 68, 65.05, 65.04
See application file for complete search history.

(56) References Cited

U.S. PATENT DOCUMENTS

| | | | | |
|---|---|---|---|---|
| 1,020,123 A | * | 3/1912 | Brampton et al. | 285/133.11 |
| 1,850,049 A | * | 3/1932 | Cornell, Jr. | 285/133.6 |
| 1,921,584 A | * | 8/1933 | Robinson | 285/133.11 |
| 2,040,628 A | * | 5/1936 | Recker | 285/133.3 |
| 2,183,271 A | * | 12/1939 | Wendel | 285/133.3 |
| 2,243,809 A | * | 5/1941 | Wendel | 285/133.6 |
| 3,944,260 A | * | 3/1976 | Petroczky | 285/133.21 |

FOREIGN PATENT DOCUMENTS

| | | |
|---|---|---|
| CN | 2315412 Y | 4/1999 |
| CN | 2435615 Y | 6/2001 |
| CN | 2477927 Y | 2/2002 |
| CN | 2495883 Y | 6/2002 |
| JP | 1-299398 A | 12/1989 |
| JP | 2-38795 A | 2/1990 |
| JP | 3-005098 A | 1/1991 |
| JP | 8-219355 A | 8/1996 |
| JP | 2660427 B2 | 6/1997 |

* cited by examiner

*Primary Examiner*—David E Bochna
(74) *Attorney, Agent, or Firm*—Birch, Stewart, Kolasch & Birch, LLP

(57) ABSTRACT

In a branch tee fitting (1) fabricated by press forming, engaging pawls (14) are provided which engage flat portions (13) superposed to each other at angles in the region between the tubular body portion (11) and the tubular branch portion (12), in order to enhance the brazing strength thereof and the brazing workability thereof by allowing separate brazing of pipes (P) to a tubular body portion (11) and a tubular branch portion (12).

4 Claims, 5 Drawing Sheets

(A)

(B)    (C)

BRANCH TEE FITTING

TECHNICAL FIELD

The present invention relates to branch tee fittings, and in particular to branch tee fittings fabricated by press forming.

BACKGROUND ART

Conventionally, branch tee fittings for piping have typically been fabricated by bulge forming using lead. However, the branch tee fittings thus fabricated bring high fabrication costs and other problems.

To solve such problems, a branch tee fitting is proposed which can be fabricated by subjecting a plate such as a copper plate to press forming (see, for example, Patent Document 1: Japanese Patent No. 2660427). This branch tee fitting is shown in FIGS. 8(A) to 8(C). FIGS. 8(A) and 8(B) are front and side views of a branch tee fitting (100), respectively, and FIG. 8(C) is a vertical mid-sectional view of the fitting shown in FIG. 8(A).

The branch tee fitting (100) includes: a tubular body portion (101) having a pair of openings at both ends; and a tubular branch portion (102) perpendicular to the tubular body portion (101). The tubular body portion (101) and the tubular branch portion (102) are formed in such a manner that one plate is bent, and along a plane inclusive of the center line of the tubular body portion (101) and the center line of the tubular branch portion (102), facing edges of the bent plate are joined in superposed relation.

In the branch tee fitting (100), the tubular body portion (101) has a substantially U-shaped cross section passing through the center of the tubular branch portion (102) (the middle position of the tubular body portion (101)), and has a substantially C-shaped cross section at both end locations thereof. In angles between the tubular body portion (101) and the tubular branch portion (102), flat portions (103) are provided, respectively, in which corners of the plate are superposed to each other. The branch tee fitting (100) is joined to pipes (P) in such a manner that with the pipes (P) inserted into the tubular body portion (101) and the tubular branch portion (102), respective joint faces of the fitting and the pipes, including the matching faces of the flat portions (103), are brazed at one time.

DISCLOSURE OF INVENTION

Problems to be Solved by Invention

However, with the structure shown in FIG. 8, spring back after the press forming may affect the joint faces to hinder their adhesion, which would create a gap therebetween. Thus, during brazing, the entire gap between the joint faces may not be filled uniformly with a solder material to weaken the brazing strength. If such a trouble occurs, particularly in the case where pipes (P) for flowing a high-pressure coolant are connected to the fitting in a refrigerant piping system or the like, leakage of the coolant or other problems would arise.

Further, in the branch tee fitting (100) mentioned above, if formation of the fitting (100) alone is completed, the solder material solidifies on inner surfaces of the tubular body portion (101) and the tubular branch portion (102) to protrude in bead form. This hinders joint of the pipes (P). In addition, if a single pipe (P) at a time is connected to the branch tee fitting (100) made by press forming, connection of one pipe causes enlargement of gaps at the other connecting points to deform the branch tee fitting (100). To avoid such troubles, in the fitting shown in Patent Document 1, brazing should be carried out by one operation at the timing at which the pipes (P) and the fitting (100) are joined to each other and in the state in which the pipes (P) are inserted into all the three connecting points in the tubular body portion (101) and the tubular branch portion (102). However, in some cases, such brazing by one operation at any situation limits the workability.

The present invention is designed with the above-mentioned problems in mind, and its object is to enhance the brazing strength of a branch tee fitting fabricated by press forming and to allow separate brazing of pipes into a tubular body portion and a tubular branch portion to enhance the brazing workability.

Means for Solving the Problems

The present invention provides a branch tee fitting which is fabricated by press forming and which is provided with engaging pawls (14) for engaging flat portions (13) to suppress spring back after the press forming, thereby preventing a gap between joint faces from widening.

To be more specific, a first invention is based on the premise of a branch tee fitting comprising: a tubular body portion (11) having a pair of openings at both ends; and a tubular branch portion (12) perpendicular to the tubular body portion (11), the tubular body portion (11) and the tubular branch portion (12) being formed in such a manner that one plate (1a) is bent and along a plane inclusive of the center line of the tubular body portion (11) and the center line of the tubular branch portion (12), facing edges of the bent plate (1a) are joined in superposed relation, angles between the tubular body portion (11) and the tubular branch portion (12) being formed with flat portions (13), respectively, in which corners of the plate (1a) are superposed to each other.

Furthermore, the branch tee fitting is characterized by including engaging pawls (14) for engaging the superposed flat portions (13).

With the first invention, in the branch tee fitting fabricated by subjecting one plate (1a) to press forming, the flat portions (13) superposed in the angle between the tubular body portion (11) and the tubular branch portion (12) are in engaging relation to each other with the engaging pawl (14). Such a structure can resist spring back after the press forming to keep the gap between the joint faces of the flat portions minimum and uniform. Therefore, during brazing, a solder material flows into the gap and solidifies uniformly, which stabilizes the brazing quality. In addition, even though one pipe (P) at a time is brazed to the fitting, engagement of the flat portions (13) with the engaging pawl (14) prevents deformation of the fitting.

A second invention is characterized in that in the branch tee fitting according to the first invention, each of the engaging pawls (14) is formed on one of the superposed flat portions (13), and constructed so that it is bent over the other of the flat portions (13) to engage both of the flat portions (13).

With the second invention, the engaging pawl (14) formed on one of the superposed flat portions (13) is bent over the surface of the other of the flat portions (13) to engage both of the flat portions (13). This prevents spring back after press forming.

A third invention is characterized in that in the branch tee fitting according to the second invention, each of the flat portions (13) is formed in a substantially triangular region defined by a base end of the tubular branch portion (12) and an edge side which is a straight line connecting associated corner points of the tubular body portion (11) and the tubular branch portion (12).

With the third invention, in the plate (1a) before press forming, the engaging pawls (14) are formed in associated triangular tip areas of four rectangular corner regions of the plate (1a). Therefore, the whole of the rectangular material for the plate (1a), even including the corners, can be utilized efficiently, and it is unnecessary to employ the material shaped so that the engaging pawls (14) additionally protrude from associated corners of the rectangular plate (1a).

A fourth invention is characterized in that in the branch tee fitting according to the third invention, each of the engaging pawls (14) is arranged at the middle position of the edge side of the corresponding flat portion (13).

With the fourth invention, the engaging pawl (14) engages the superposed flat portions (13) at the center of the edge sides of the flat portions (13), so that the flat portions (13) can be held stably.

A fifth invention is characterized in that in the branch tee fitting according to the fourth invention, each of the engaging pawls (14) is formed in a triangular shape whose width decreases with distance from the edge side of the flat portion (13).

With the fifth invention, the engaging pawl (14) can be formed in a triangular region almost similar to the shape of the flat portion (13). Thus, almost the entire surfaces of the flat portions (13) can be held extremely stably.

A sixth invention is characterized in that in the branch tee fitting according to the first invention, the tubular body portion (11) and the tubular branch portion (12) are provided with: fitting portions (11a, 12a) which are fitted with pipes (P) inserted thereinto; and small diameter portions (11b, 12b) which have smaller diameters than the fitting portions (11a, 12a), respectively.

With the sixth invention, the tubular body portion (11) and the tubular branch portion (12) are provided with: the fitting portions (11a, 12a) into which pipes (P) are inserted and fitted; and the small diameter portions (11b, 12b) located inwardly from the fitting portions (11a, 12a) and having smaller diameters than the fitting portions (11a, 12a), respectively. This prevents oversufficient or insufficient insertion of the pipes (P).

Advantageous Effect of the Invention

With the first invention described above, the branch tee fitting is provided with the engaging pawls (14) for engaging the superposed flat portions (13), which resists spring back after press forming to keep the gap between the joint faces of the flat portions minimum and uniform. Therefore, during brazing, a solder material flows into the gap and solidifies uniformly. This stabilizes the brazing quality and enhances the brazing strength. Thus, the resulting fitting is sufficiently usable even in the case where pipes (P) for flowing a high-pressure coolant are connected thereto in a refrigerant piping system.

Moreover, each of the engaging pawls (14) engages the flat portions (13) to prevent deformation of the fitting even though one pipe (P) at a time is brazed to the fitting. This enables separate connection of three pipes (P). Furthermore, similarly to the conventional technique, the three pipes can also be brazed to this fitting by one operation. Consequently, with the present invention, the brazing workability can be enhanced.

With the second invention described above, each of the engaging pawls (14) can be formed on one of the superposed flat portions (13) to prevent spring back after press forming. Therefore, it is unnecessary to form the engaging pawls (14) on both of the flat portions (13). This simplifies the structure of the branch tee fitting.

With the third invention described above, each of the flat portions (13) is formed in a substantially triangular region defined by the base end of the tubular branch portion (12) and the edge side which is a straight line connecting associated corner points of the tubular body portion (11) and the tubular branch portion (12), whereby the engaging pawls (14) can be formed in triangular regions of the plate (1a) which have been located outside the flat portions (13) before the press forming. Therefore, the plate (1a) including the engaging pawls (14) can be obtained by cutting a rectangular material plate with efficiency. This eliminates material waste and increase in cost.

With the fourth invention described above, the engaging pawl (14) engages the superposed flat portions (13) at the center of the edge sides of the flat portions (13), whereby the flat portions (13) can be held stably. This brings the brazing stabilization, and in addition enhancement of the brazing strength can be expected.

With the fifth invention described above, each of the engaging pawls (14) is formed on a triangular region almost similar to the shape of the flat portion (13), whereby almost the entire surfaces of the flat portions (13) are held extremely stably. Therefore, further stabilization of brazing and further enhancement of the brazing strength can be expected.

With the sixth invention described above, the tubular body portion (11) and the tubular branch portion (12) are provided with: fitting portions (11a, 12a) which are fitted with pipes (P) inserted thereinto; and small diameter portions (11b, 12b) which have smaller diameters than the fitting portions (11a, 12a), respectively. This prevents oversufficient or insufficient insertion of the pipes (P). For example, the fitting described in Patent Document 1 prevents oversufficient or insufficient insertion by forming part of each of the pipes (P) in an annular protrusion. However, in the sixth invention, it is unnecessary to perform such a complicated formation on the edge surfaces of the pipes (P), which simplifies the structure of the fitting.

BRIEF DESCRIPTION OF THE DRAWINGS

FIGS. 8(A) and 8(B) are front and side views thereof, respectively, and FIG. 8(C) is a vertical mid-sectional view thereof.

Figure 1:
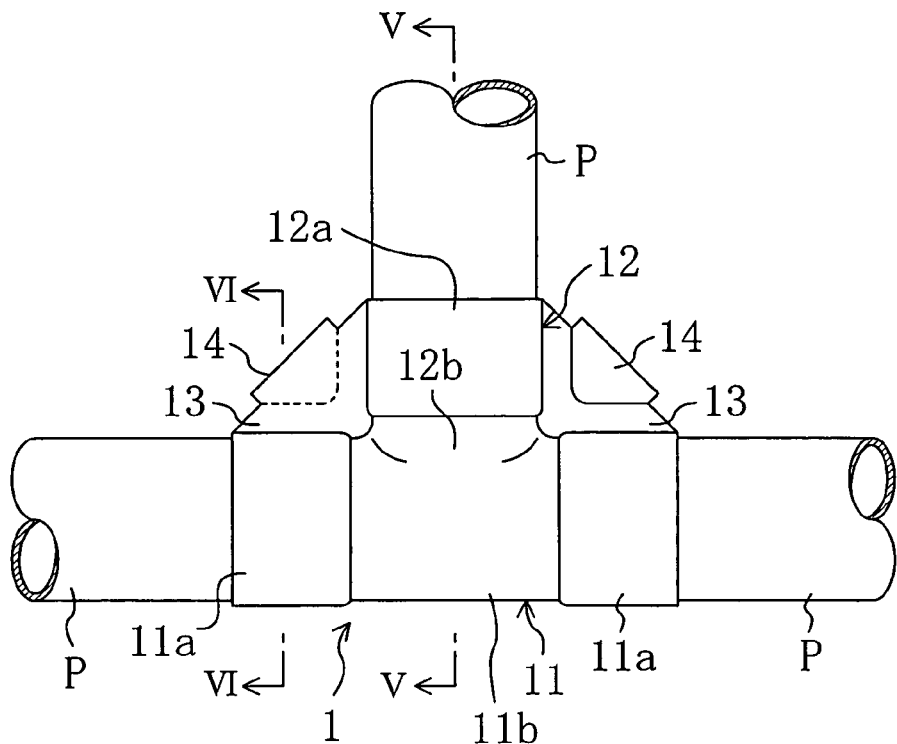
FIG. 1 is a front view of a branch tee fitting according to one embodiment of the present invention in the state in which pipes are joined thereto.

EXPLANATION OF REFERENCES 1 branch tee fitting
1a plate
11 tubular body portion
11a fitting portion
11b small diameter portion
12 tubular branch portion
12a fitting portion 12b small diameter portion
13 flat portion
14 engaging pawl

BEST MODE FOR CARRYING OUT THE INVENTION

Hereinafter, embodiments of the present invention will be described in detail based on the accompanying drawings.

Figure 2:
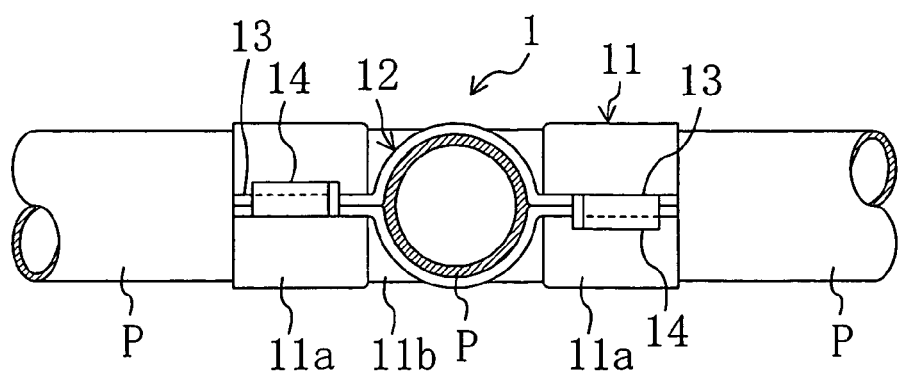
FIG. 2 is a plan view of the fitting in FIG. 1.
Figure 3:
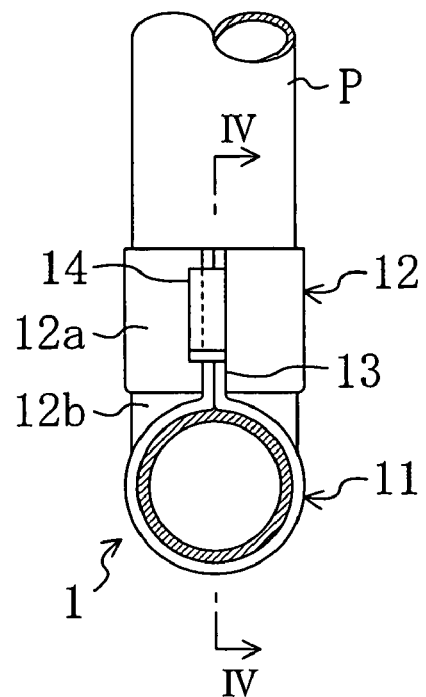
FIG. 3 is a right side view of the fitting in FIG. 1.
Figure 4:
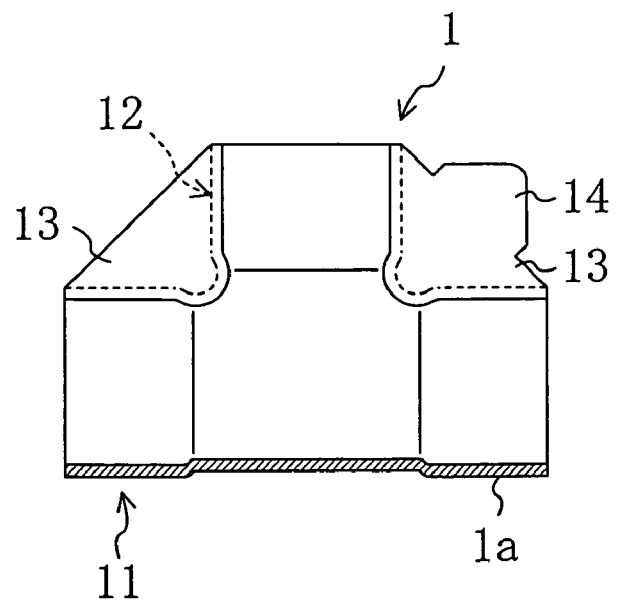
FIG. 4 is a sectional view showing main parts of the branch tee fitting (which corresponds to a sectional view taken along the line IV-IV in FIG. 3).
Figure 5:
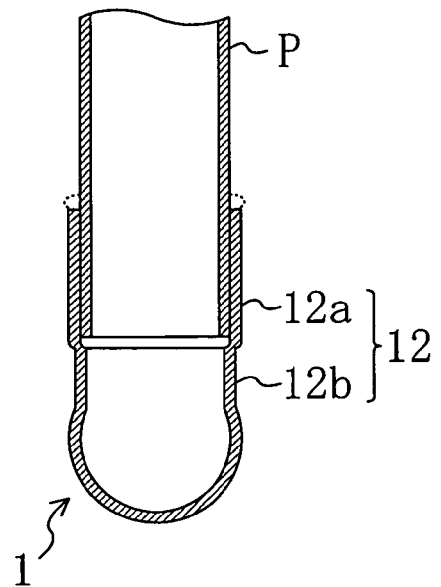
FIG. 5 is a sectional view of the fitting taken along the line V-V in FIG. 1.
Figure 6:
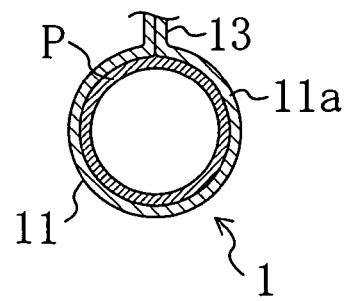
FIG. 6 is a sectional view of the fitting taken along the line VI-VI in FIG. 1.

FIG. 1 is a front view of a branch tee fitting according to this embodiment in the state in which pipes (P) are joined thereto. FIGS. 2 and 3 are a plan view and a right side view of the fitting, respectively. FIG. 4 is a sectional view showing main parts of the branch tee fitting (which corresponds to a sectional view taken along the line IV-IV in FIG. 3), FIG. 5 is a sectional view of the fitting taken along the line V-V in FIG. 1, and FIG. 6 is a sectional view of the fitting taken along the line VI-VI in FIG. 1.

As illustrated in these figures, the branch tee fitting (1) includes: a tubular body portion (11) having a pair of openings at both ends; and a tubular branch portion (12) perpendicular to the tubular body portion (11). In the branch tee fitting (1), the cross section taken perpendicularly to the center line of the tubular body portion (11) has a substantially U-shape, as shown in FIG. 5, at the location passing through the center of the tubular branch portion (12), and has a substantially C-shape, as shown in FIG. 6, at both end locations thereof.

The branch tee fitting (1) shown above is fabricated in such a manner that one plate (1a) is bent and along a plane inclusive of the center line of the tubular body portion (11) and the center line of the tubular branch portion (12), facing edges of the bent plate (1a) are joined in superposed relation, thereby forming the tubular body portion (11) and the tubular branch portion (12). As is apparent from FIG. 4, in angles between the tubular body portion (11) and the tubular branch portion (12), flat portions (13) are provided, respectively, in which corners of the plate (1a) are superposed to each other.

A characteristic of the present invention is that the branch tee fitting (1) is formed with engaging pawls (14) for engaging the superposed flat portions (13). The engaging pawls (14) are each formed on one of the superposed flat portions (13). To be more specific, when viewed in FIG. 1, one engaging pawl (14) is formed on the rear one of the flat portions (13, 13) superposed on the right side of the tubular branch portion (12) (see FIG. 4), while the other engaging pawl (14) is formed on the front one of the flat portions (13, 13) superposed on the left side of the tubular branch portion (12). Each of the engaging pawls (14) is bent over the surface of the opposing flat portion (13) to pinch that portion, thereby engaging both of the flat portions (13).

Each of the flat portions (13) is formed in a substantially triangular region defined by a base end of the tubular branch portion (12) and an edge side which is a straight line connecting associated corner points of the tubular body portion (11) and the tubular branch portion (12). Each of the engaging pawls (14) is arranged at the middle position of the edge side of the corresponding flat portion (13), and formed in a triangular shape whose width decreases with distance from the edge side of the flat portion (13). To be more specific, in this embodiment, the engaging pawls (14) are each shaped in a triangle almost similar to and slightly smaller than the shape of the flat portion (13).

The tubular body portion (11) and the tubular branch portion (12) are provided with: fitting portions (11a, 12a) which are fitted with pipes (P) inserted thereinto; and small diameter portions (11b, 12b) which have smaller diameters than the fitting portions (11a, 12a), respectively. The small diameter portions (11b, 12b) are formed by squeezing to some extent parts of the tubular body portion (11) and the tubular branch portion (12) located inwardly from the fitting portions (11a, 12a), respectively.

In this embodiment, when one plate (1a) is subjected to press forming to fabricate the branch tee fitting, the flat portions (13) superposed in the angle between the tubular body portion (11) and the tubular branch portion (12) are thus in engaging relation to each other with the engaging pawl (14). Such a structure can resist spring back after the press forming to keep the gap between the joint faces of the flat portions minimum and uniform. Therefore, during brazing, a solder material flows into the gap and solidifies uniformly, which stabilizes the brazing quality. As a result, the brazing strength is enhanced, and the resulting fitting is sufficiently usable even in the case where pipes (P) for flowing a high-pressure coolant are connected thereto in a refrigerant piping system.

In conventional techniques, connection of a single pipe (P) at a time to the branch tee fitting causes deformation of the fitting. To prevent this deformation, at any situation, three pipes (P) have to be connected by one operation. In contrast to this, in this embodiment, even though one pipe (P) at a time is brazed to the fitting, engagement of the flat portions (13) with the engaging pawl (14) prevents deformation of the fitting (1). This enables separate connection of three pipes (P). In addition, similarly to the conventional techniques, the three pipes can also be brazed to this fitting by one operation. Consequently, a suitable connection technique for required working can be selected to enhance the brazing workability.

Moreover, in this embodiment, only formation of the engaging pawl (14) on one of the superposed flat portions (13) can prevent spring back after press forming, so that it is unnecessary to form the engaging pawls (14) on both of the flat portions (13). This simplifies the structure of the branch tee fitting. Furthermore, each of the flat portions (13) is formed in the substantially triangular region defined by the base end of the tubular branch portion (12) and the edge side which is a straight line connecting associated corner points of the tubular body portion (11) and the tubular branch portion (12), whereby the engaging pawls (14) can be formed in triangular regions of the plate (1a) which have been located outside the flat portions (13) before the press forming. Therefore, the plate (1a) including the engaging pawls (14) can be obtained by cutting a rectangular material plate with efficiency. This eliminates material waste and increase in cost.

Furthermore, in this embodiment, the engaging pawl (14) engages the superposed flat portions (13) at the center of the edge sides thereof, and the engaging pawl (14) is shaped in a triangle almost similar to the shape of the flat portion (13). Thus, almost the entire surfaces of the flat portions (13) are held extremely stably, which enables stabilization of brazing and enhancement of the brazing strength.

Moreover, in this embodiment, the tubular body portion (11) and the tubular branch portion (12) are provided with: the fitting portions (11a, 12a) which are fitted with pipes (P) inserted thereinto; and the small diameter portions (11b, 12b) which have smaller diameters than the fitting portions (11a, 12a), respectively. This prevents oversufficient or insufficient insertion of the pipes (P). For example, the fitting described in Patent Document 1 prevents oversufficient or insufficient insertion by forming part of each of the pipes (P) in an annular protrusion (see the virtual line in FIG. 5). However, in this embodiment, it is unnecessary to perform such a complicated formation on the edge surfaces of the pipes (P), which simplifies the structure of the fitting.

OTHER EMBODIMENTS

In relation to the embodiment shown above, the present invention may apply structures as described below.

Figure 7:
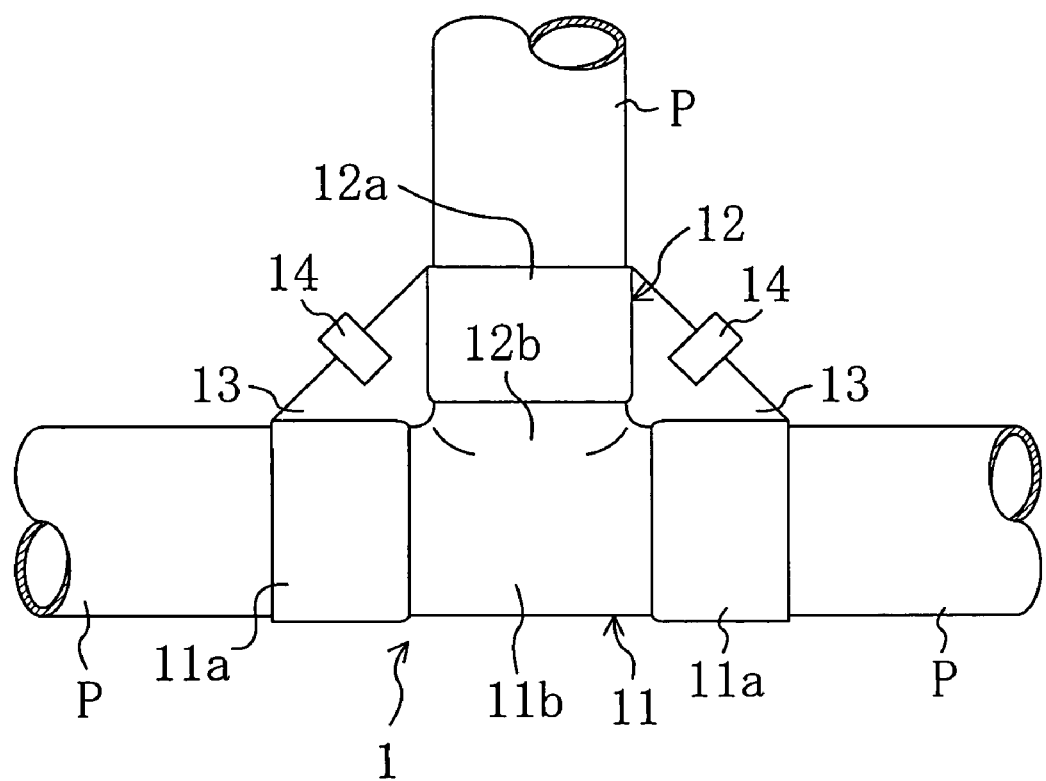
FIG. 7 is a front view showing a branch tee fitting of one modification of FIG. 1.
Figure 8:
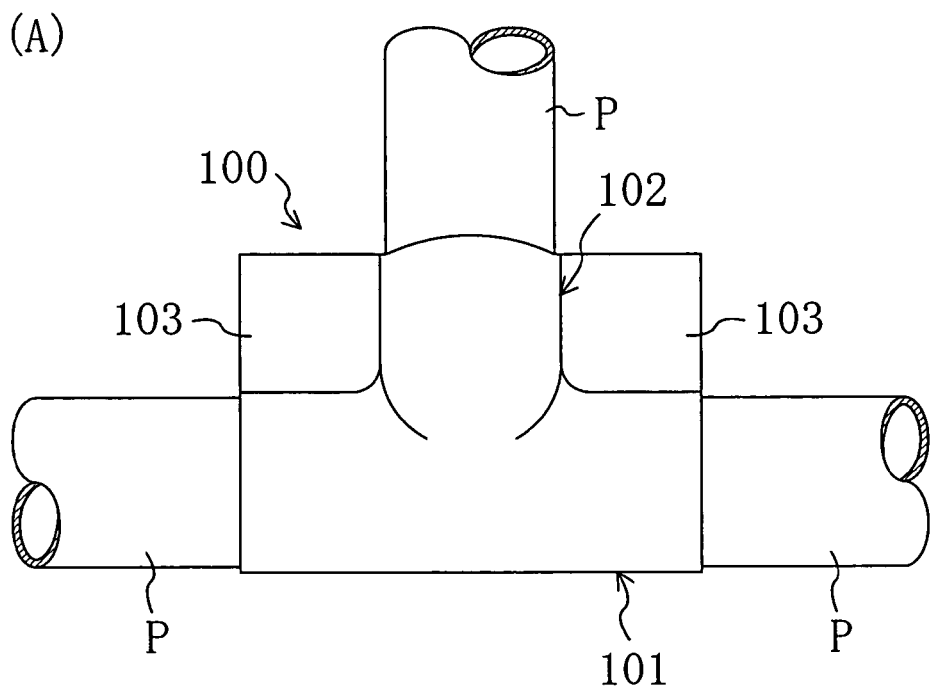
FIG. 8 shows the structure of a conventional branch tee fitting.
Figure 8:
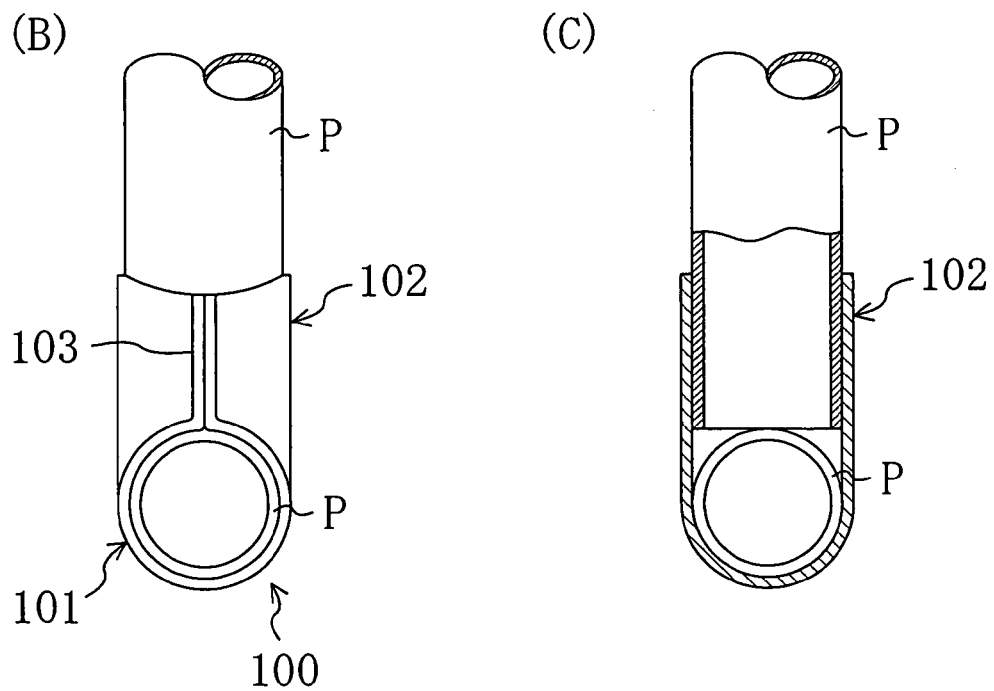

For example, the shape of the engaging pawl (14) may be changed as shown in FIG. 7. In this example, the engaging pawls (14) are formed in rectangles and disposed at the centers of the flat portions (13), respectively. In FIG. 7, the engaging pawls (14) are provided on the rear flat portions (13) located on the right and left sides of the tubular branch portion (12), respectively. Such a decrease in dimension of the engaging pawl (14) probably reduces the pressure resisting strength of the branch tee fitting (1) to some extent. However, the process for bending the engaging pawls (14) is carried out easily, which further enhances the workability.

Note that the embodiments described above are merely shown as essentially-preferred exemplifications and they are not intended to limit the scope of the present invention, its applications, or its uses.

INDUSTRIAL APPLICABILITY

As described above, the present invention is useful for branch tee fittings fabricated by press forming.

What is claimed is:

1. A branch tee fitting comprising: a tubular body portion (11) having a pair of openings at both ends; and a tubular branch portion (12) perpendicular to the tubular body portion (11), the tubular body portion (11) and the tubular branch portion (12) being formed in such a manner that one plate (1a) is bent and along a plane inclusive of the center line of the tubular body portion (11) and the center line of the tubular branch portion (12), facing edges of the bent plate (1a) are joined in superposed relation, angles between the tubular body portion (11) and the tubular branch portion (12) being formed with flat portions (13), respectively, in which corners of the plates (1a) are superposed to each other, wherein the branch tee fitting includes engaging pawls (14) for engaging the superposed flat portions (13), wherein each of the engaging pawls (14) is formed on one of the superposed flat portions (13), and constructed so that it is bent over the other of the flat portions (13) to engage both of the flat portions (13)

wherein each of the flat portions (13) is formed in a substantially triangular region defined by a base end of the tubular branch portion (12) and an edge side which is a straight line connecting associated corner points of the tubular body portion (11) and the tubular branch portion (12).

2. The fitting of claim 1,
wherein each of the engaging pawls (14) is arranged at the middle position of the edge side of the corresponding flat portion (13).

3. The fitting of claim 2,
wherein each of the engaging pawls (14) is formed in a triangular shape whose width decreases with distance from the edge side of the flat portion (13).

4. The fitting of claim 1,
wherein the tubular body portion (11) and the tubular branch portion (12) are provided with: fitting portions (11a, 12a) which are fitted with pipes (P) inserted thereinto; and small diameter portions (11b, 12b) which have smaller diameters than the fitting portions (11a, 12a), respectively.

* * * * *